US012752936B2

(12) United States Patent
Sinn et al.

(10) Patent No.: US 12,752,936 B2
(45) Date of Patent: Oct. 6, 2026

(54) SYSTEM FOR A SATELLITE, CARRIER PANEL AND SATELLITE

(71) Applicant: Dcubed GmbH, Germering (DE)

(72) Inventors: Thomas Sinn, Germering (DE); Antonio Pedivellano, Germering (DE); Joram Mathias Gruber, Germering (DE); Guillem Quintana Buil, Germering (DE); Laura Katharina Schmitz, Germering (DE)

( * ) Notice: Subject to any disclaimer, the term of this patent is extended or adjusted under 35 U.S.C. 154(b) by 14 days.

(21) Appl. No.: 18/931,574

(22) Filed: Oct. 30, 2024

(65) Prior Publication Data

US 2025/0145310 A1 May 8, 2025

(30) Foreign Application Priority Data

Nov. 3, 2023 (DE) ..................... 10 2023 130 425.9

(51) Int. Cl.
*B64G 1/22* (2006.01)
*B64G 1/10* (2006.01)
*B64G 1/44* (2006.01)

(52) U.S. Cl.
CPC ............. *B64G 1/2225* (2023.08); *B64G 1/10* (2013.01); *B64G 1/443* (2013.01)

(58) Field of Classification Search
CPC .................... B64G 1/2225; B64G 1/10; B64G 1/222–2229
See application file for complete search history.

(56) References Cited

U.S. PATENT DOCUMENTS

| | | | | | |
|---|---|---|---|---|---|
| 6,147,294 | A * | 11/2000 | Dailey | B64G 1/2229 244/172.6 |
| 9,611,056 | B1 * | 4/2017 | Spence | B64G 1/2229 |
| 10,189,583 | B2 * | 1/2019 | Abrams | B64G 1/2229 |
| 10,734,941 | B2 * | 8/2020 | Jeon | F16M 11/2085 |
| 10,773,833 | B1 * | 9/2020 | Harvey | B64G 1/443 |

(Continued)

FOREIGN PATENT DOCUMENTS

| | | |
|---|---|---|
| CN | 112367031 A | 2/2021 |
| CN | 115384814 A | 11/2022 |

OTHER PUBLICATIONS

DE Office Action for corresponding DE Patent Application No. 10 2023 130 425.9, dated Apr. 5, 2024, 15 pages.

*Primary Examiner* — Kimberly S Berona
*Assistant Examiner* — Katherine June Walter
(74) *Attorney, Agent, or Firm* — RENNER, OTTO, BOISELLE & SKLAR LLP; Gary J. Pitzer

(57) ABSTRACT

Disclosed is a system for a satellite, the system including a carrier panel and a tensioning device, the tensioning device being switchable from a holding state, in which it holds the carrier panel in a transportation pose, to a release state, in which it permits movement of the carrier panel from the transportation pose into a working pose, wherein the system is configured such that the carrier panel is elastically deformed in the transportation pose and, after switching the tensioning device into the release state, a restoring force based on the elastic deformation of the carrier panel contributes to the movement of the carrier panel from the transportation pose into the working pose. Furthermore, a corresponding carrier plate and a satellite are disclosed.

19 Claims, 10 Drawing Sheets

(56) References Cited

U.S. PATENT DOCUMENTS

| | | | | |
|---|---|---|---|---|
| 2002/0195177 | A1 * | 12/2002 | Hinkley | F03G 7/0615 148/645 |
| 2017/0320600 | A1 * | 11/2017 | Cruijssen | B64G 1/2228 |
| 2024/0300673 | A1 * | 9/2024 | Fasanella | B64G 1/42 |
| 2024/0351711 | A1 * | 10/2024 | Yates | B64G 1/643 |
| 2025/0164741 | A1 * | 5/2025 | Hattori | F16M 11/123 |

* cited by examiner

SYSTEM FOR A SATELLITE, CARRIER PANEL AND SATELLITE

CROSS-REFERENCE TO RELATED APPLICATIONS

This application claims the benefit and priority of German Patent Application No. 10 2023 130 425.9, filed on 3 Nov. 2023, the disclosure of which is incorporated by reference herein in its entirety as part of the present application.

The present invention relates to a system for a satellite, a carrier panel and a satellite.

Satellites are generally required to be as compact as possible during transportation into space. The performance of some functional components, such as solar panels or antennas, depends on their spatial size. For this reason, current solutions provide for such components to be transported into space in a compact transport state and only then to be converted to a less compact working state. Thereby, it must be taken into account that the satellite with the components is exposed to high accelerations and vibrations during the flight into space. It must be ensured that the components can also be reliably converted to the working state after this transportation. The weight of the satellite and the components should also be kept as low as possible.

With this in mind, a system for a satellite, a carrier panel and a satellite according to the appended claims are provided in accordance with the invention.

According to a first exemplary aspect of the present disclosure, a system for a satellite is provided. The system comprises a carrier panel. The carrier panel can be essentially flat or planar. The carrier panel can for example be used to support functional elements such as at least one solar cell, at least one antenna, at least one heat radiator and/or at least one camera. One or more such functional elements can be arranged on the carrier panel.

The carrier panel is elastically deformable. The carrier panel can be bent elastically (e.g., about one or more bending axes or by arching). The carrier panel can comprise two essentially parallel surface plates and a core material lying between the surface plates. The surface plates can consist of a plastic material, in particular a particle- and/or fiber- and/or fabric-reinforced plastic material. The core material can comprise a plastic foam. It is also conceivable that the core material is scaffold-like, for example honeycomb-shaped. In this case, the core material can comprise a plastic and/or a metal (e.g. aluminium) and/or a metal alloy. Alternatively, the carrier panel can also have a two-layer or single-layer structure, for example be a metal plate.

The system also comprises a tensioning device. The tensioning device can be switched from a holding state, in which it holds the carrier panel in a transportation pose, to a release state, in which it allows the carrier panel to be moved from the transportation pose to a working pose. The transportation pose can correspond to a position of the carrier panel (e.g., relative to the satellite) during transportation into space, and the working pose can correspond to a position of the carrier panel (e.g., relative to the satellite) after transportation into space. In the transportation pose of the carrier panel, the system may be more compact than when the carrier panel is arranged in the working pose. In one example, the transportation pose may be referred to as a held pose, folded pose or collapsed pose. In one example, the working pose may be referred to as a released pose, unfolded pose or deployed pose.

The system is configured such that the carrier panel is elastically deformed in the transportation pose and, after switching the tensioning device to the release state, a restoring force based on the elastic deformation of the carrier panel contributes to the movement of the carrier panel from the transportation pose to the working pose.

The carrier panel may be elastically biased in the transportation pose, for example biased in a direction of the movement or in the direction of the working pose, so that the carrier panel strives to return to the working pose. The system can be configured such that the restoring force causes the carrier panel to move from the transportation pose to the working pose. Alternatively, or in addition, the system can be configured such that the restoring force provides at least the majority of the force or work required to move the carrier panel from the transportation pose to the working pose.

The system may be configured such that the elastic deformation can be adjusted (e.g., manually). A degree of elastic deformation and/or a direction of deformation (e.g., one or more bending axes) may be set. For example, the elastic deformation may be adjustable or adjusted before the system is transported into space. It is conceivable that the system can be adjusted so that the desired elastic deformation is present after a subsequent arrangement of the carrier panel in the transportation pose. It is also conceivable that the carrier panel is arranged in its transport position and the system is adjusted in this state in order to pre-set the desired elastic deformation.

The elastic deformation may comprise a bending of at least one section of the carrier panel. The bending can occur around one or more bending axes. The bending may involve indenting or curving. The at least one section may correspond to a predominant portion of the carrier panel.

The system may be configured for equipping a satellite or to be attached to a satellite. For example, the system is configured such that the carrier panel in the transport state lies opposite a base element attached to the satellite, in particular essentially parallel thereto (e.g., neglecting the elastic deformation, parallel thereto). The base element can be a mounting plate attached to the satellite. The base element may be another carrier panel.

The tensioning device may be configured to exercise a holding force on a first area of the carrier panel in the holding state. For this purpose, the tensioning device may pull on the first area or press on the first area. The holding force may point in the direction of the base element and/or satellite. For example, the tensioning device is configured to, in the holding state, push or pull the first area of the carrier panel in the direction of the base element and/or satellite. The holding force may be used to pretension the carrier panel. The holding force may contribute to the elastic deformation of the carrier panel and/or cause the elastic deformation of the carrier panel. The tensioning device may allow adjustment of the distance of the first area of the carrier panel from the base element and/or satellite and, thus, also allow adjustment of the elastic deformation of the carrier panel in its transportation pose.

The system may further comprise a support device. The support device may be configured to, in the transport state, support the carrier panel, for example a second area of the carrier panel (e.g. relative to the base element and/or the satellite). The support device may be configured to absorb a support force opposite to the holding force in the transportation pose of the carrier panel and/or to guide it onto the second area of the carrier panel. The support device may be attached to the carrier panel, for example in the second area. In one example, the support device is configured to, in the transport state of the carrier panel, adjustably define a distance of the second area from the base element. The support force may contribute to the elastic deformation of the carrier panel and/or cause the elastic deformation of the carrier panel. The support device may permit adjustment of the distance of the second area of the carrier panel from the base element and, thus, also adjustment of the elastic deformation of the carrier panel in its transportation pose.

For example, the second area is spaced from the first area in the direction of an outer edge of the carrier panel. The first area may correspond to a central area of the carrier panel, whereas the second area may correspond to an edge area of the carrier panel. In the transportation pose, the first region may be arranged closer to the base element than the second region. The elastic deformation therefore may include a (e.g. multi-axial) deflection of the carrier panel in the direction of the base element. The resulting restoring force may push the first area of the carrier panel away from the base element.

At least one of the tensioning device and the support force device may be configured such that it allows the magnitude of the holding force and/or the support force to be adjusted. For this purpose, for example, the support device may be adjusted so that a distance between the second section of the carrier panel and the base element defined by the support device changes. It is also conceivable to adjust the tensioning device in such a way that a distance between the first section of the carrier panel and the base element changes. Each of these changes in distance would cause a change in the elastic deformation and thus also a change in the magnitude of the holding and support force.

The support device may comprise a support element. The support element may be arranged on or in the second area of the carrier panel. The support element may be configured such that it enables the carrier panel to be supported at different support angles. The support angle is determined by the elastic deformation of the carrier panel in its transport pose. Among other things, this can allow the second area of the carrier panel to tilt relative to the base element, while the carrier panel can be held securely in the transportation pose. In one example, the support element comprises an essentially spherical surface that forms a support (e.g., a seat) for the carrier panel in the transport position. This support can serve to transmit the support force to the support element. The support element can be configured to be adjustable (e.g., height-adjustable) in order to provide the adjustability of the support device. It is also conceivable to provide non-adjustable or fixed support elements if no adjustment of the elastic deformation by adjusting the support device is desired in their respective areas.

In one example, the tensioning device, in the holding state, is fixed to a central area of the carrier panel (e.g., to the first area). In the holding state, the tensioning device may also be fixed to the base element and/or to the satellite. The tensioning device can thus be configured such that, in the holding state, it detachably secures the carrier panel to the base element and/or to the satellite. The tensioning device may be configured such that, in the release state, it releases the carrier panel relative to the base element and/or the satellite for movement into the working pose.

The tensioning device may comprise a connecting element which, in the holding state, couples the carrier panel to the base element and/or to the satellite. For this purpose, in the holding state, one end of the connecting element may be fixed to the carrier panel and another end of the connecting element may be fixed to the base element and/or to the satellite. The connecting element may be elongated. The connecting element, in the holding state, may extend through a through-hole in the carrier panel. The tensioning device may be configured to release the connecting element when switching to the release state (e.g., to release at least one of the two fixed ends) or to cut through the connecting element. The connecting element may be flexible or rigid, for example in the form of a wire or a rod (e.g., made of metal or a metal alloy). The connecting element may be under tensile stress in the holding state and thereby cause the elastic deformation of the carrier panel.

The tensioning device may be configured to, in the holding state, center the carrier panel in a predetermined position at least in its length and width direction. For example, the tensioning device comprises a centering element for centering the carrier panel. The centering element may be configured such that it enables the first area of the carrier panel to be coupled in the transportation pose at only one predetermined coupling angle. The coupling angle may be selected such that the first area is essentially parallel to the base element. Among other things, this can enable the first region of the carrier panel to be centered and aligned relative to the base element, while the carrier panel can be held securely in the transportation pose. The centering element may comprise a substantially frustoconical surface, which surface may form a support in the holding state of the tensioning device and/or in the transportation pose of the carrier panel.

In one example, the movement of the carrier panel from the transportation pose to the working pose comprises a rotation about an axis of rotation. The axis of rotation may be provided by a hinge. The system may include the hinge and the hinge may be attached to the carrier panel. The hinge may further be attached to the base element or to another carrier panel. The hinge may provide an engagement position that predetermines the working pose of the carrier panel. The hinge may comprise a hinge spring that urges the carrier panel in the direction of the working pose. The hinge may comprise an electrical connection that provides an electrical contact between the carrier panel and the component attached to the other end of the hinge, in particular the base element. The hinge may comprise a damping device that decelerates the carrier panel (e.g., uniformly) at least over a part of the movement path of the carrier panel when said panel moves along the movement path into the working pose.

The system may be configured such that the elastic deformation of the carrier panel in a first part of the carrier panel is less than in a second part of the carrier panel, with the first part being closer to the hinge than the second part. For this purpose, fixed support elements can be provided on the first part, while adjustable support elements can be provided on the second part.

The tensioning device may comprise an actuator that is configured to switch the tensioning device from the holding state to the release state. The actuator may be operated electrically. The actuator may be configured to bring the tensioning device from the holding state to the release state using a change in volume and/or temperature. The actuator may comprise an explosive charge, a shape memory material or an electric motor. The actuator may be configured to be attached or mounted to the satellite and/or to the base element. The actuator may be configured to be decoupled from the carrier panel in the release state. The actuator may cause a part of the tensioning device that is attached to the carrier panel to decouple from the base element and/or the satellite, for example by releasing one end of the connecting element or by severing the connecting element.

The system may comprise several carrier panels (e.g., more than one carrier panel). For example, the system may comprise at least one further carrier panel, wherein the tensioning device, in the holding state, also holds the at least one further carrier panel in its transportation pose and, in the release state, also permits movement of the at least one further carrier panel from its transportation pose to its working pose. The system may be configured such that the carrier panels are stacked on top of each other in their transportation poses. The carrier panels may form a cantilever in their working poses and, in particular, lie next to each other in an accordion-like or essentially flat manner. The carrier panels may be connected to each other by hinges.

The system may also be designed such that the at least one further carrier panel is elastically deformed in its transportation state and, after the tensioning device has been switched into the release state, a restoring force based on the elastic deformation of the at least one further carrier panel contributes to the movement of the at least one further carrier panel from its transportation pose into its working pose.

In the holding state, the connecting element may couple an uppermost carrier panel of the system's multiple, stacked carrier panels to the base element and/or to the satellite. For this purpose, one end of the connecting element may be fixed to the uppermost carrier panel in the holding state and another end of the connecting element may be fixed to the base element and/or the satellite. In the holding state, the connecting element may extend through a through-hole in several of the carrier panels, for example in each of the carrier panels (e.g., except the uppermost carrier panel). In the holding state, the connecting element may be under tensile stress and thereby cause the elastic deformation of several or even each of the carrier panels.

According to a second exemplary aspect of the present disclosure, a carrier panel is provided. The carrier panel may be configured to be used in the system of the first exemplary aspect. The carrier panel may have the features described above and/or the features described with reference to the figures.

According to a third exemplary aspect of the present disclosure, a satellite is provided. The satellite comprises the system of the first exemplary aspect described herein and/or the carrier panel of the second exemplary aspect.

It is to be understood that the system can be attached to the satellite, for example via the base element or by attaching the carrier panel directly to the satellite (e.g. via the hinge). The base element can be a carrier panel and/or part of the satellite.

Details of the system, the carrier panel and the satellite are described below with reference to the figures, where:

Figure 1A:
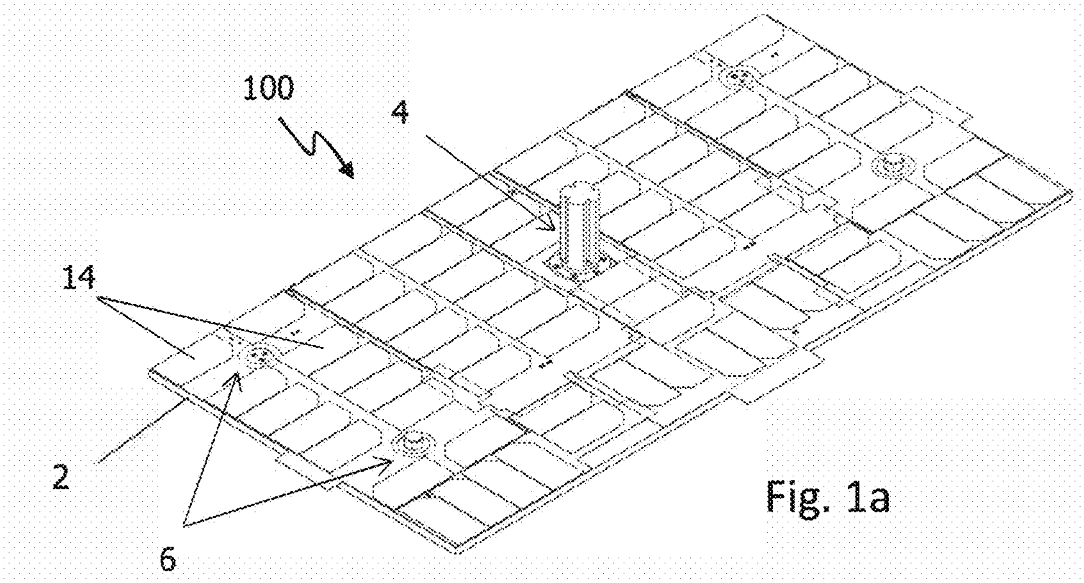
FIGS. 1a-1b show a top view and a bottom view of a first system.
Figure 1B:
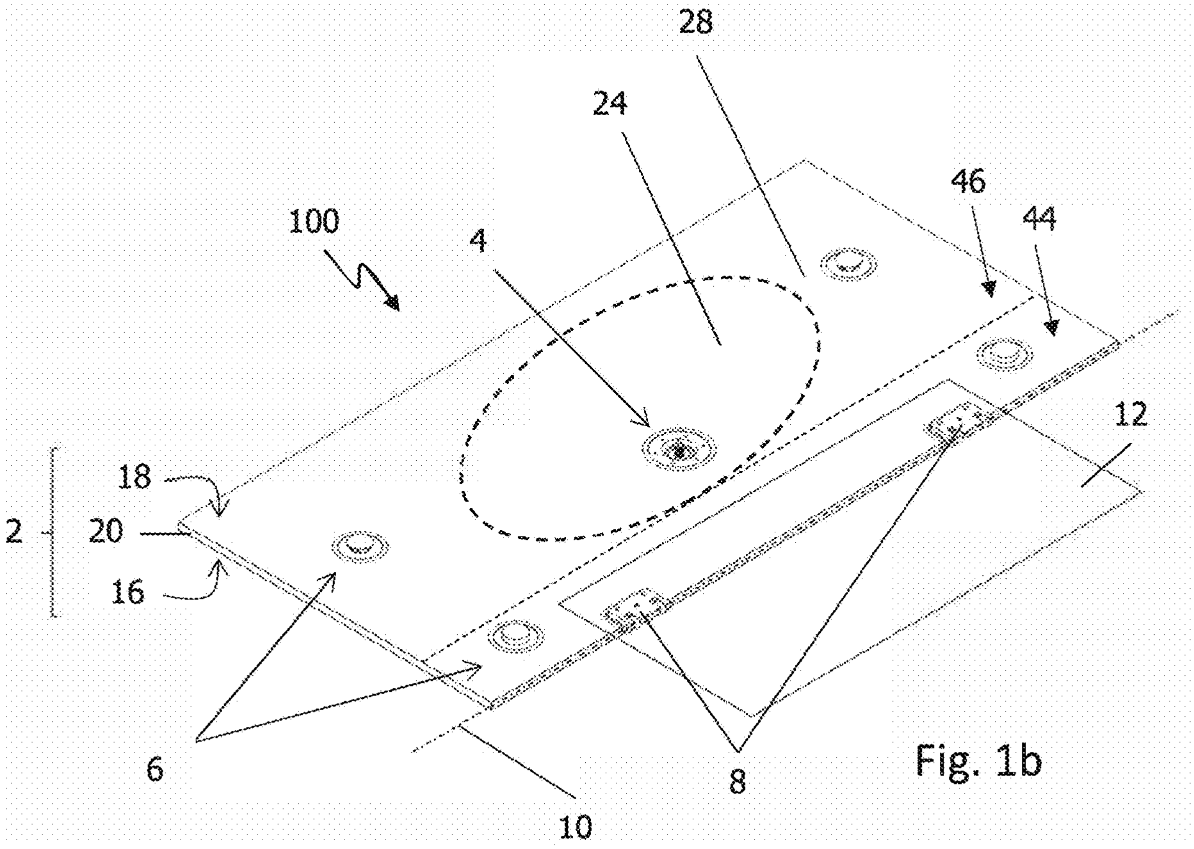

FIGS. 1a and 1b show a first system 100 according to the present disclosure. The system 100 comprises a carrier panel 2, a tensioning device 4 and one or more support devices 6.

The tensioning device 4 can be moved from a holding state to a release state. In the holding state, the tensioning device 4 holds the carrier panel 2 in a transportation pose. In the release state, the tensioning device 4 releases the carrier panel so that it can move from the transportation pose to a working pose. The tensioning device 4 is configured to hold the carrier panel 2 in the compact transportation pose during transportation into space and then to release it when a corresponding control signal is present, so that the carrier panel 2 can move into the working pose. Two hinges 8 are attached to the carrier panel 2, which define an axis of rotation 10 about which the carrier panel can rotate or unfold from the transportation pose to the working pose. The hinges 8 are also attached to a satellite 200 or a base element 12 attached to the satellite 200, so that the movement of the carrier panel 2 is relative to the satellite 200 or the base element 12. The base element 12 can itself be configured as a carrier panel that is attached to the satellite.

In the example shown, solar cells 14 are arranged on the carrier panel 2. These can be electrically connected to the base element 12 or to the satellite 200, for example via an electrical connection provided in or on the hinges 8. Instead of, or in addition to the solar cells 14, other functional elements such as sensors, antennas or radiators can also be used.

The carrier panel 2 may be multi-layered and comprise a flat upper cover plate 16 and a flat, parallel lower cover plate 18, each made of a fiber-reinforced plastic. In this case, a core material 20 is arranged between the two cover plates 16, 18, which core material 20 can be a plastic foam or a honeycomb-like support structure made of a folded aluminium sheet. However, it is also conceivable to provide only a two-layer or only a single-layer carrier panel, in particular in the form of an aluminium plate.

The carrier panel 2 is elastically deformable. The carrier panel 2 can therefore be transferred from a resting state shape to a deformed shape and then automatically returns to the resting state shape. The resting state shape is present in particular in the working pose of the carrier panel 2. The elastic deformation of the carrier panel 2 includes bending of the carrier panel 2.

The carrier panel 2 is elastically deformed in the transport state of the tensioning device 4. After switching the tensioning device 4 to its release state, the carrier panel 2 is released, whereby a restoring force based on the elastic deformation of the carrier panel 2 contributes to the movement of the carrier panel 2 from the transportation pose to the working pose. The spring tension of the carrier panel 2 stored in the transport state is therefore used to bring the carrier panel 2 into the working pose as required. The pre-tensioning of the carrier panel 2 in the transportation pose in the direction of the working pose also serves to reliably attach the carrier panel to the base element 12 or the satellite 200 during transportation into space.

Figure 2:
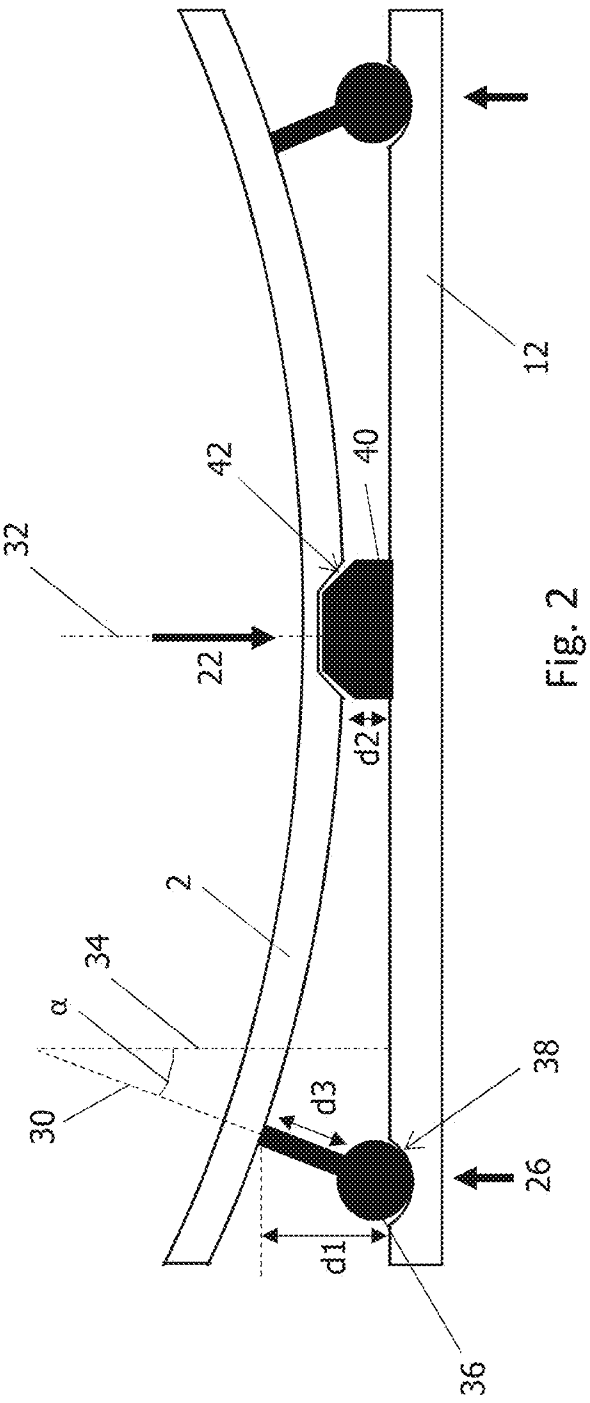
FIG. 2 shows a schematic representation of the first system.

FIG. 2 shows a schematic representation of the system 100 with the carrier panel 2 in the transportation pose. It can be seen that the tensioning device 4 exercises a holding force 22 on a first area 24 of the carrier panel 2. The support device 6 supports a second area 26 of the carrier panel 2 relative to the base element 12.

Thus, a support force 26 opposite to the holding force 22 is exercised on the second area 28 of the carrier panel 2. This constellation leads to a bending of the carrier panel 2 in the transportation pose. It can be said that in the transportation pose, when the tensioning device 4 is in the holding state, the carrier panel 2 is held by the tensioning device 4 and supported or mounted by the support device 6. Accordingly, the carrier panel 2 is elastically deformed (e.g., deflected) in the transportation pose by the interaction of the tensioning device 4 and the support device 6. As shown in FIGS. 1*a*-2, the system 100 can comprise several of the support devices 6.

The elastic deformation of the carrier panel 2 in the transportation pose is defined in particular by the number, position and adjustment of the support devices 6. As shown in FIG. 1*b*, the carrier panel 2 comprises a first part 44 and a second part 46, with the first part 44 being closer to the hinges 8 than the second part 46. In order to keep the bending load on the hinges 8 low and still provide the greatest possible restoring force of the carrier panel 2, the elastic deformation of the carrier panel 2 can be greater in the second part 46 than in the first part 44.

In the example shown in FIGS. 1*a*-2, the second area 28 is an edge area of the carrier panel 2, the first area 24 is located in a center of the carrier panel. Several support devices 6 are provided in the edge area, in the example shown four symmetrically arranged support devices 6. This results in the carrier panel 2 in the transportation pose not only being bent about a single bending axis, but being bent in several dimensions, in particular being curved or bulged. In this case, the stored spring tension of the carrier panel 2 in its transportation pose is higher compared to a bend around only one bending axis, while bending radii of the carrier panel 2 are kept large.

It may be provided that the elastic deformation of the carrier panel 2 is adjustable, in particular to maintain the smallest possible bending radii and/or to provide a desired restoring force. For example, functional elements that can be attached to the carrier panel 2 may have different requirements with regard to possible deformations of the carrier panel 2 (e.g., predefine the smallest allowable bending radii of the carrier panel 2). To adjust the elastic deformation, it is conceivable to manually adjust the distance d1 of the second region 28 from the base element 12 defined by the support device(s) 6 (e.g., using a suitable tool) before transportation into space. Alternatively or additionally, the distance d2 defined by the tensioning device 4 could be adjusted manually. Adjusting the elastic deformation causes the restoring force of the carrier panel 2 to be adjusted. The greater the deformation of the carrier panel, the higher the contact pressure of the carrier panel 2 in the direction of the restoring force on the supports. In particular, a stronger deformation can ensure that the carrier panel is firmly clamped in the transportation pose, such that it is reliably held in the transportation pose when the satellite is launched. The restoring force can be selected depending on the resonant frequency of the carrier panel. Alternatively or additionally, the restoring force can be selected depending on the vibration frequencies and/or vibration amplitudes and/or acceleration values occurring during transportation, in particular occurring during the launch of a transport rocket of the satellite.

Due to the bending of the transport plate 2, its surface normal 30 in the second area 28 is not parallel to the surface normal 32 in the first area 24, but has an angle $\alpha>0°$ in relation to the latter. For the sake of clarity, an auxiliary line 34 is drawn in FIG. 2, which runs parallel to the normal 32.

In the example shown in FIG. 2, the support device 6 comprises a support element 36 with a rounded, in particular essentially spherical surface 38, which forms a support in the transportation state of the carrier panel 2. The support force 26 is led into this support. Adjusting the distance d1, in particular by adjusting the distance d3 of the support element 36 from the second area 28, results in a change in the angle $\alpha$. The spherical surface 36 can ensure that the second area 28 of the carrier panel 2 is securely supported, even if the exact angle $\alpha$ is not known in advance.

The tensioning device 4 has a centering element 40. The centering element 40 serves to center the carrier panel 2 in its length and width direction, so that the first area 24 of the carrier panel 2 is in a predetermined length and width position relative to the base element 12 in the transportation pose. The height position corresponds to the distance d2, which can also be predetermined by the tensioning device 4. Instead of a spherical surface, the centering element 40 has a substantially frustoconical surface 42, which forms a further support in the holding state of the tensioning device 4 and in the transportation pose of the carrier panel 2. Since the normal 32 in the first region 24 always has a predetermined orientation relative to the base element 12, it is not necessary to provide a spherical surface here. The frustoconical surface 42 can ensure reliable centering.

Figure 3B:
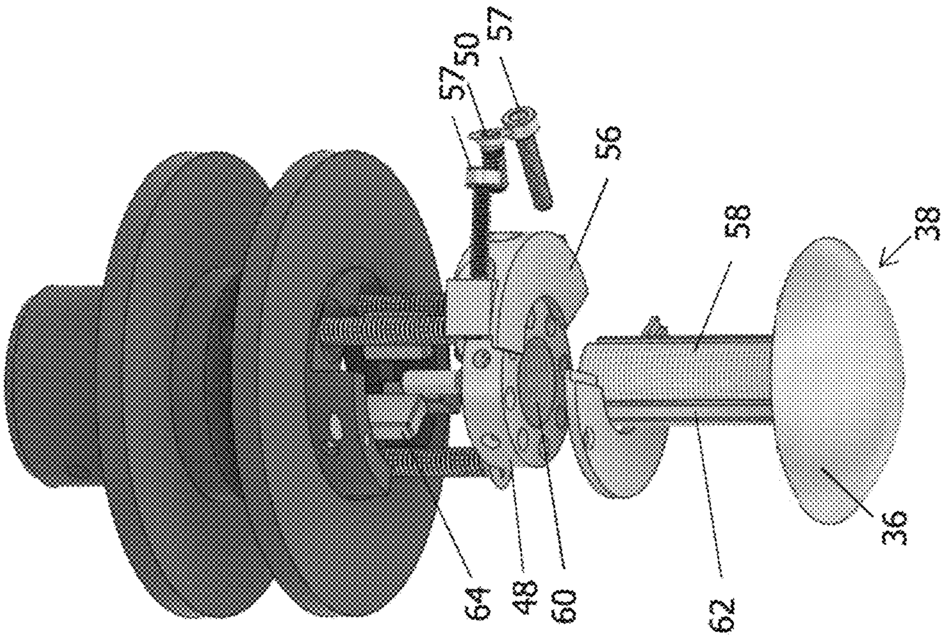
FIG. 3a-3 show a sectional view and a perspective view of a support device of the first system.
Figure 3A:
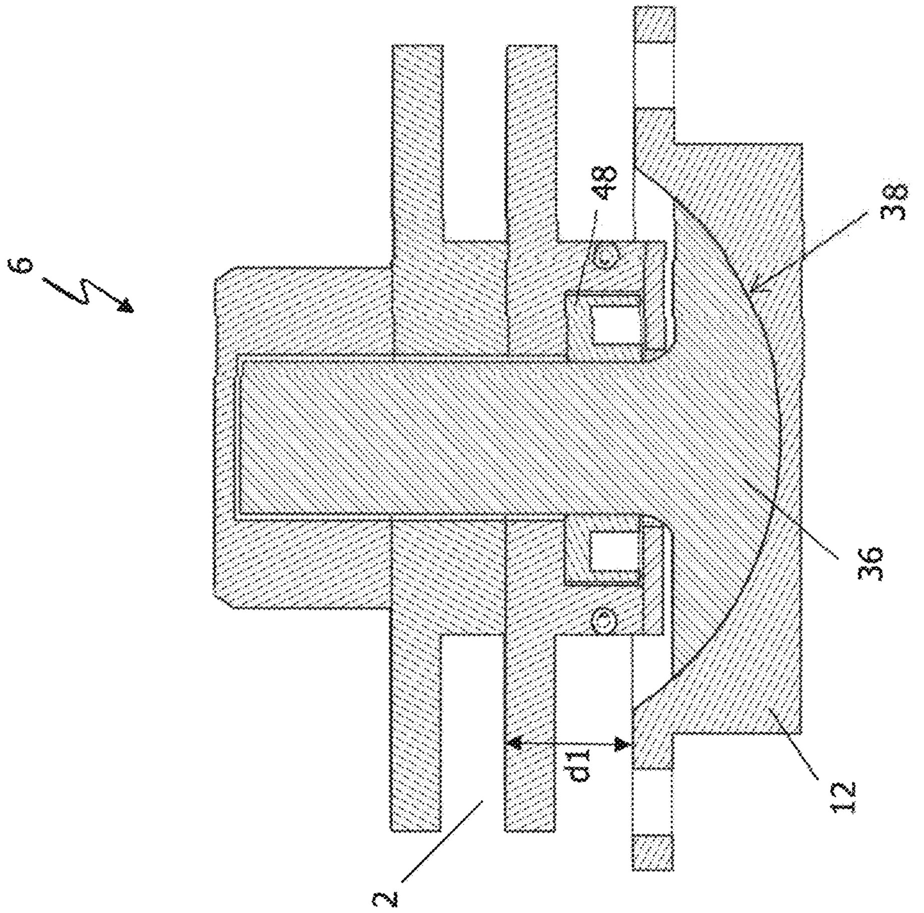

FIGS. 3*a*-3*b* show an exemplary support device 6. The support element 36 is configured to be height-adjustable, so that the height of the support element 36 and, thus, also the distance d1 can be adjusted manually. The carrier panel 2 can comprise a through-hole in which this support device 6 is arranged.

In the example shown, the support device 6 comprises an adjusting element 48, the position of which can be changed manually (e.g., using a suitable tool), wherein a change in position of the adjusting element 48 causes a displacement of the support element 36. The support device 6 further comprises a blocking system which can be manually set to a blocking state in which it blocks a change in position of the adjusting element 48 (e.g., by screwing in a screw 50). The distance between the adjusting element 48 and the carrier panel 2 can be fixed. For this purpose, the support device 6 can comprise a retaining element 56, which is fixed relative to the carrier panel 2 and fixes the distance of the adjusting element 48 relative to the carrier panel 2. The retaining element 56 can be fixed relative to the carrier panel 2 via fastening means 57. The retaining element 56 can also be part of the blocking system.

In the example shown, the support element 36 comprises an external thread 58 and the adjustment element 48 comprises a matching internal thread 60. The support device 6 may further comprise a rotation blocking mechanism which prevents rotation of the support element 36, in particular about a longitudinal axis of the external thread 58. The rotation blocking mechanism may be formed by a notch 62 of the support element 36 in the longitudinal direction of the external thread 58 and a mating engagement body 64, the position of which is fixed relative to the carrier panel 2 at least in the direction of rotation of the external thread 58. In this case, turning the adjusting element 48 causes a purely translational movement of the support element 36 in relation to the adjusting element 48 and therefore also in relation to the carrier panel 2. After turning the adjusting element 48 to set the desired distance d1, the blocking system can be set to the blocking state by screwing in the screw 50 through the retaining element 56 and the adjusting element 48. This ensures that the distance d1 does not change undesirably afterwards.

Figure 4A:
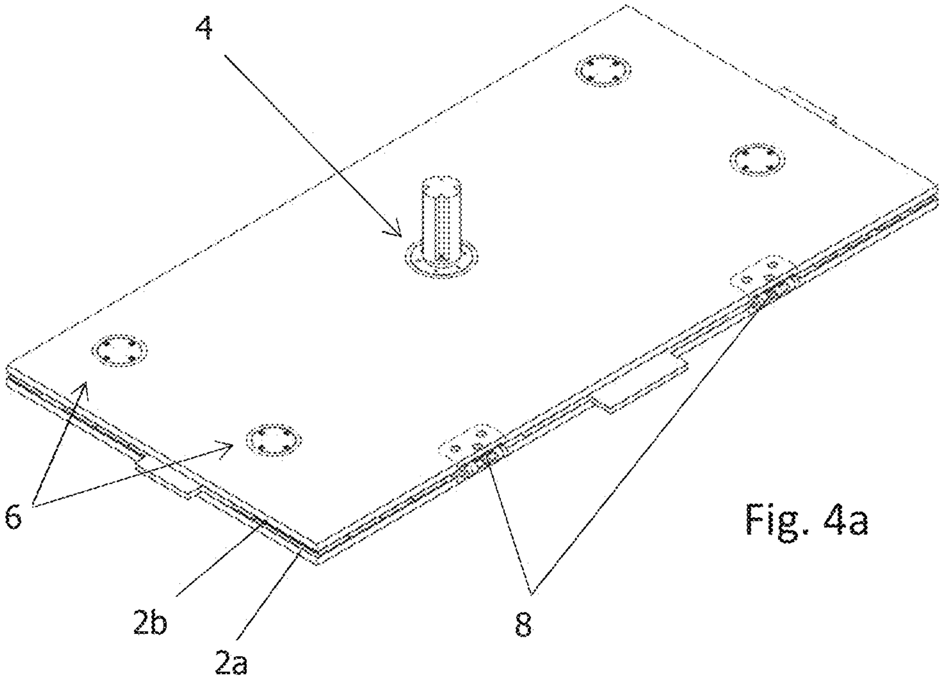
FIG. 4a-4b show a top and bottom view of a second system.
Figure 4B:
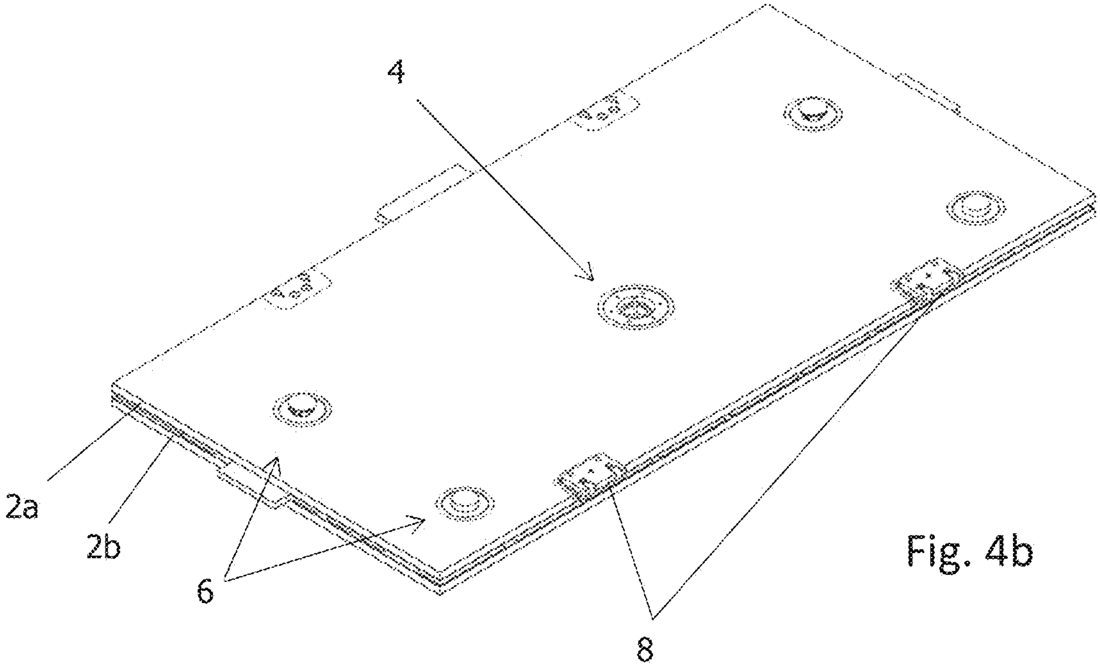

FIGS. 4*a*-4*b* show a further system 300 according to the present disclosure. Here, the system 300 comprises not only one carrier panel 2, but several carrier panels, in particular two carrier panels 2*a*, 2*b*. The carrier panels 2*a*, 2*b* are formed as described above and are connected via hinges 8. The lowest carrier panel 2*a* in the stack is again attached to the base element 12 or the satellite 200 via hinges 8, as in the case of the system 100. In the transportation pose of the carrier panels 2*a*, 2*b* shown, these lie essentially parallel on top of each other in the manner of a stack. Here too, the system 300 comprises exactly one tensioning device 4 and a plurality of storage devices 6 spaced apart from the tensioning device 4 in the transportation pose of the carrier panels 2*a*, 2*b* in the direction of the outer edge of the carrier panels 2*a*, 2*b*.

Figure 5:
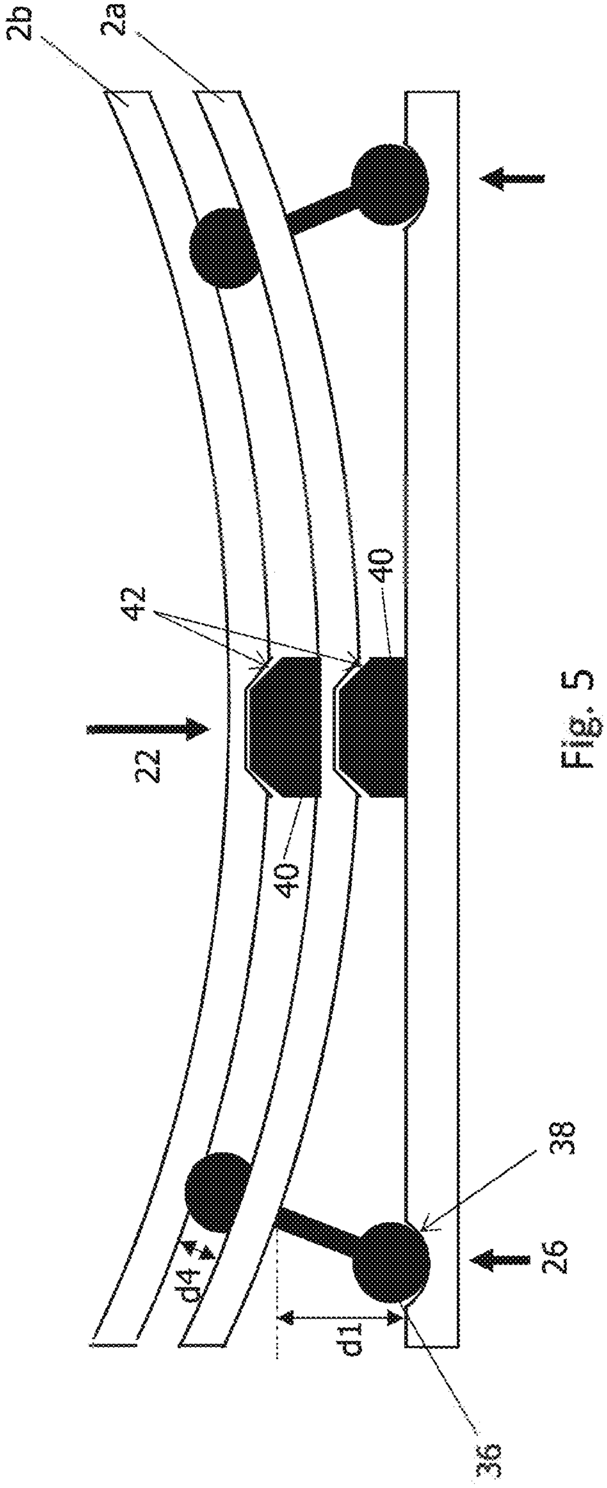
FIG. 5 shows a schematic representation of the second system.

As shown in FIG. 5, it is also envisaged here that the carrier panels 2*a*, 2*b* are elastically deformed in their transportation pose. Centering elements 40 with corresponding frustoconical surfaces 42 are provided for centering the carrier panels 2*a*, 2*b*. It is conceivable that the support devices 6 can only be adjusted on one side in order to predetermine the distance d1. One or more of the support devices 6 can alternatively or additionally be configured such that they adjustably predetermine the distance d4 between two adjacent carrier panels 2*a*, 2*b*. The carrier panels 8 can be deformed differently in their transportation poses, in particular in such a way that the respective first parts 44, which are close to the hinges 8, are less bent than the respective second parts 46, which are further away from the hinges 8.

The support devices 6 of the system 300 can be configured as shown in FIGS. 3*a*-3*b*. However, it is also possible to configure the support devices 6 of the system 300 as shown in FIGS. 6*a*-6*b*, for example to save installation space.

Figure 6B:
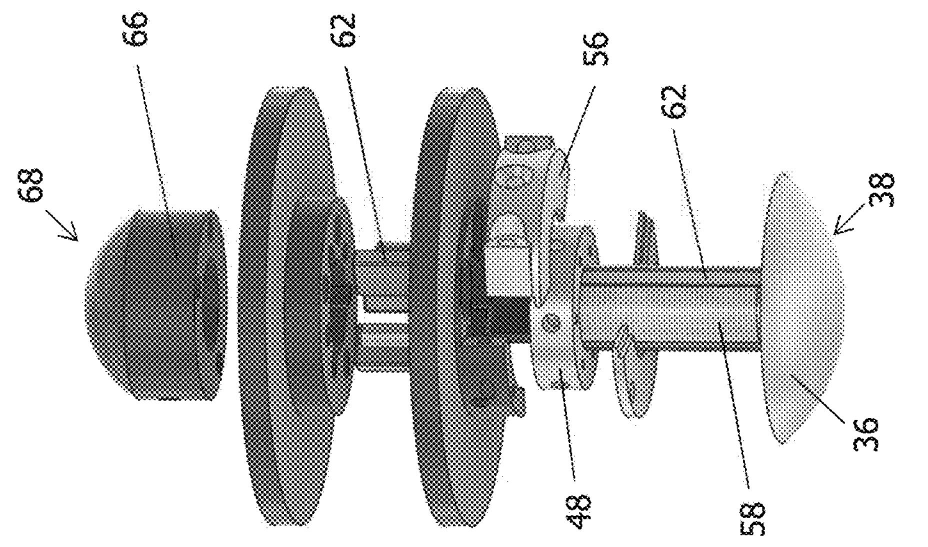
FIG. 6a-6b show a sectional view and a perspective view of a support device of the second system.
Figure 6A:
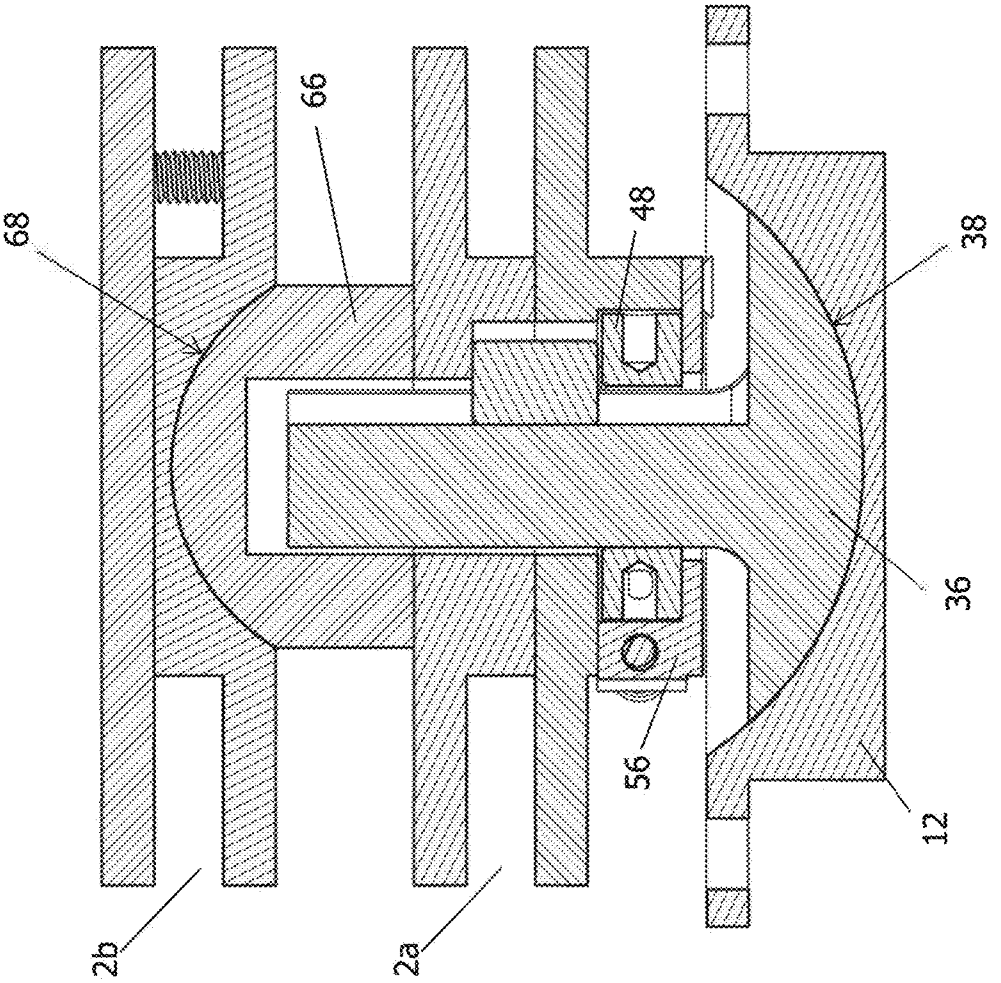

As shown in FIGS. 6*a*-6*b*, a further support element 66 can be provided as part of the support device 6 in a side of the support device 6 facing away from the surface 38. In the example shown, the further support element 62 is not height-adjustable, but its position is fixed relative to the carrier panel 2*a* provided with the support device. Non-adjustable support elements can be used in particular where the deformation of the carrier panel(s) should be low (e.g., at the first part(s) 44). The further support element 66 may comprise a rounded, substantially spherical surface 68 which, in the transportation pose of the carrier panel 2*a*, forms a further support for transmitting force to the adjacent carrier panel 2*b*.

The tensioning device 4 comprises an actuator 70, which can move the tensioning device from the holding state to the release state, in particular when a control signal is present. The actuator 70 is arranged on the satellite side and, in particular, is decoupled from the carrier panel 2 in the release state. The actuator 70 is thus arranged such that, in the working pose of the carrier panel 2, it is spaced apart from the latter and is not attached thereto. Alternatively, the actuator can also be provided on the carrier panel side, in particular attached to a carrier panel 2. Exemplary tensioning devices 4 with actuators 70 are shown in FIGS. 7*a*-9*b*.

Figure 7B:
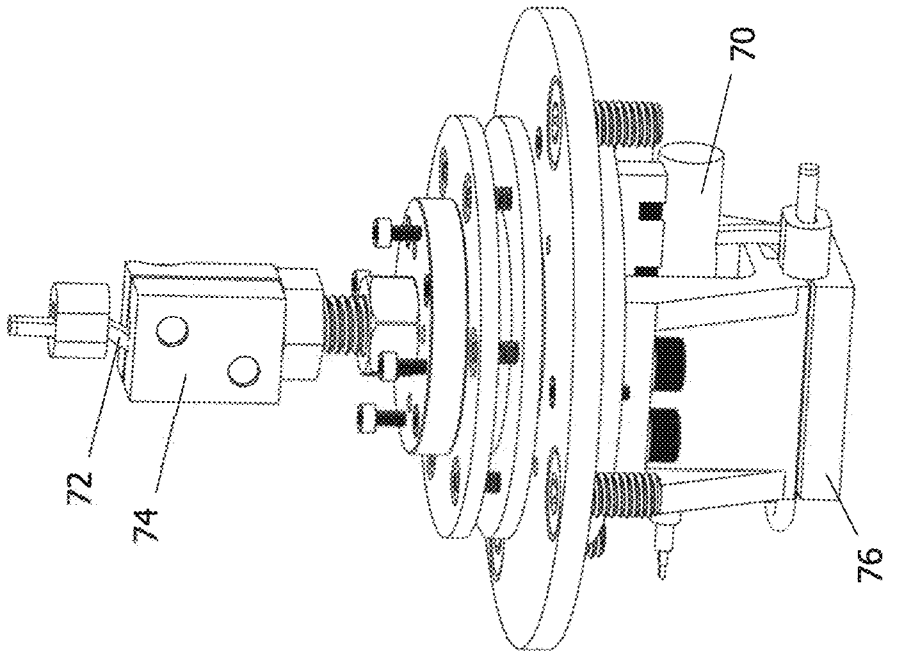
FIGS. 7a-7b show a sectional view and a perspective view of a first tensioning device.
Figure 7A:
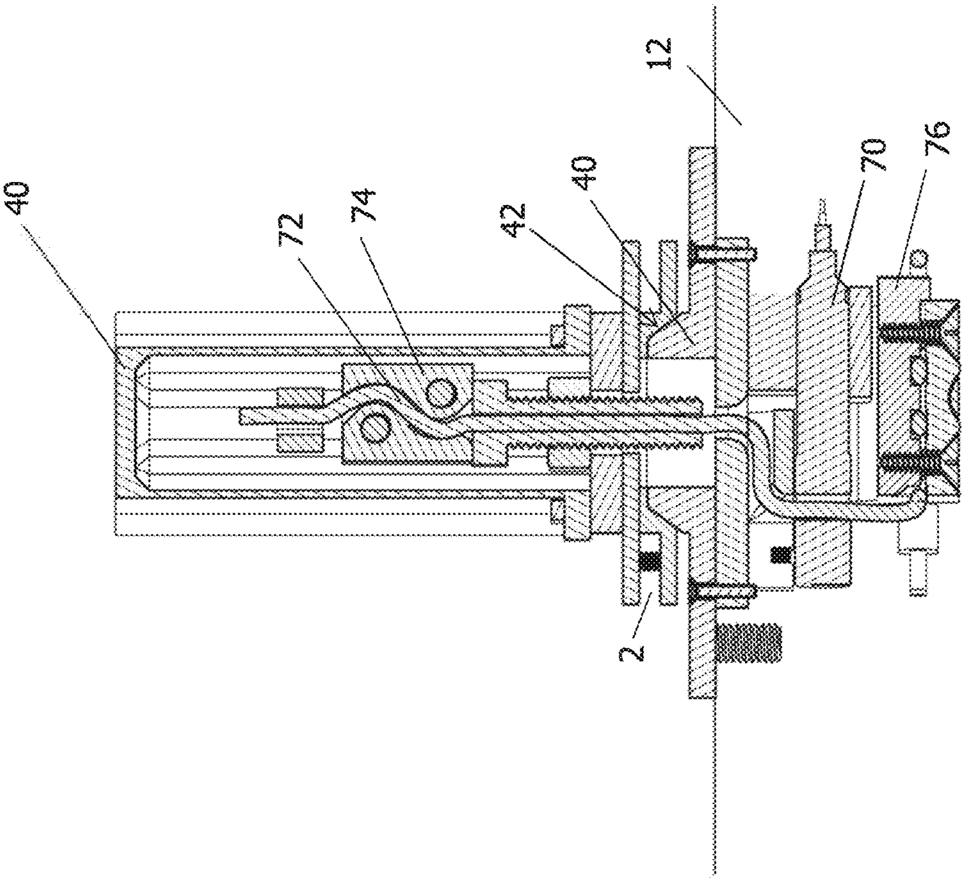

In the example shown in FIGS. 7*a*-7*b*, the tensioning device 4 is designed for use in the system 100. The tensioning device 4 comprises a connecting element 72, which is under tension in the holding state and urges the carrier panel 2 in the direction of the base element 12. The connecting element 72 is fixed both in relation to the carrier panel 2 and in relation to the base element 12, in the example shown by clamping devices 74, 76. In the holding state, the connecting element 72 extends through a through-hole in the carrier panel 2 and can in particular be configured as a wire.

In the example shown in FIGS. 7*a*-7*b*, the actuator 70 cuts through the connecting element 72 when a corresponding control signal is received. This releases a movement of the carrier panel 2 away from the base element 12. Since the carrier panel 2 is elastically deformed by the connecting element 72 in the holding state, the restoring force resulting from the elastic deformation causes the carrier panel 2 to be pushed away from the base element 12 in the direction of the working pose. The actuator 70 can be a thermal actuator and may comprise an explosive charge.

Figure 8A:
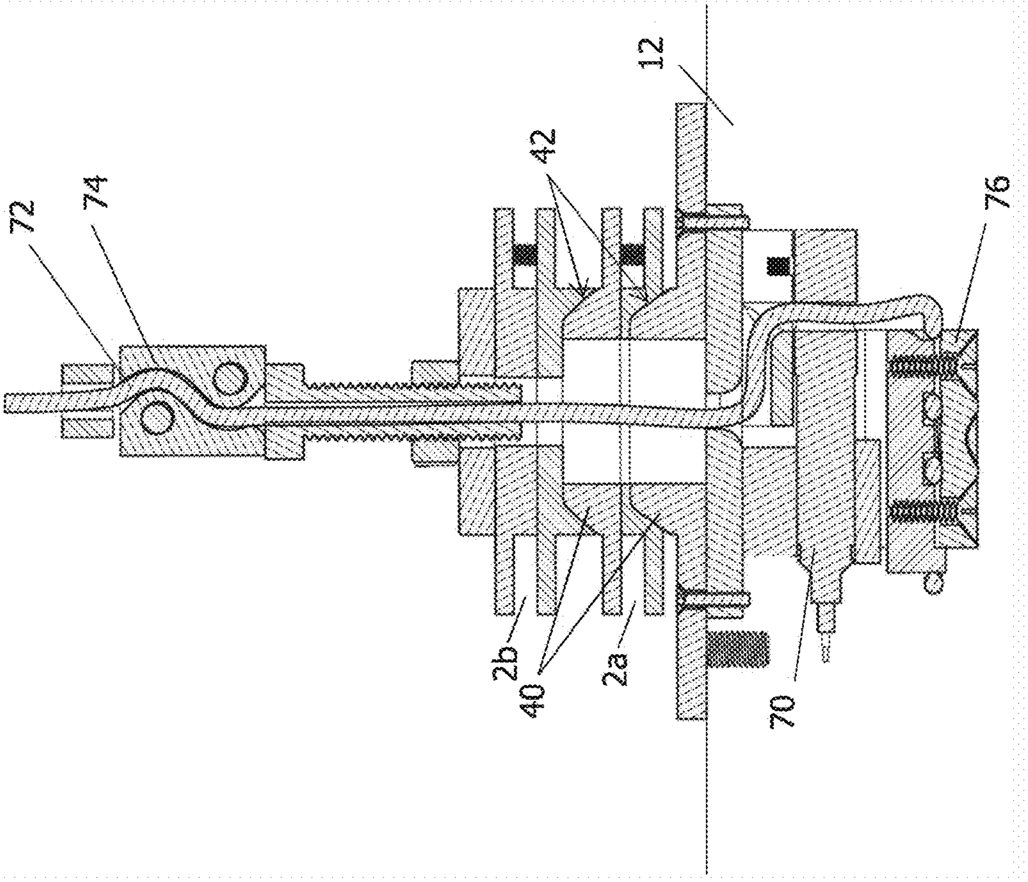
FIGS. 8a-8b show a sectional view and a perspective view of a second tensioning device.
Figure 8B:
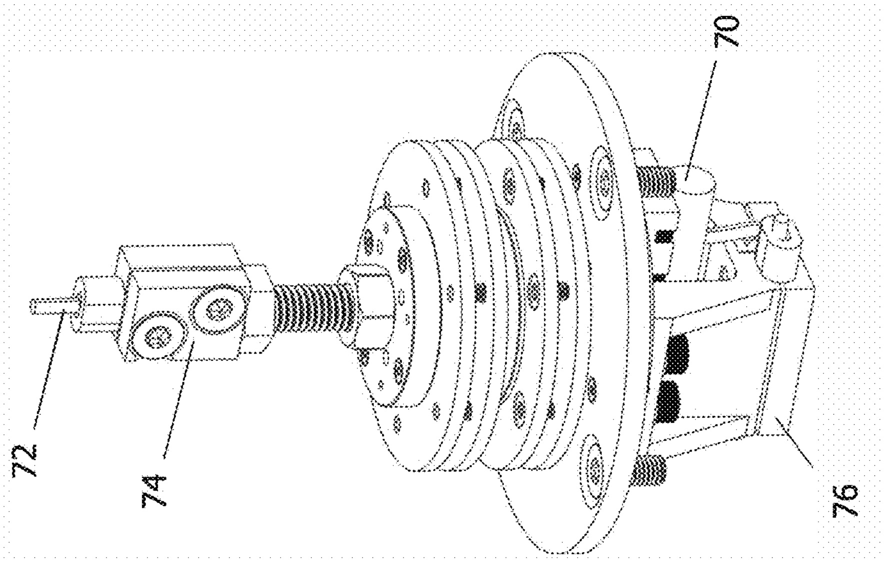

In the example shown in FIGS. 8*a*-8*b*, the tensioning device 4 is designed for use in the system 300. Here, the connecting element 72 passes through both carrier panels 2*a*, 2*b* in the holding state of the tensioning device 4. Thus, exactly one connecting element 72 can be provided, which is under tensile stress in the holding state and holds several carrier panels 2 of the system elastically deformed in their transportation poses. When the actuator 70 cuts through this connecting element 72, all carrier panels 2 can move into their working poses.

Figure 9B:
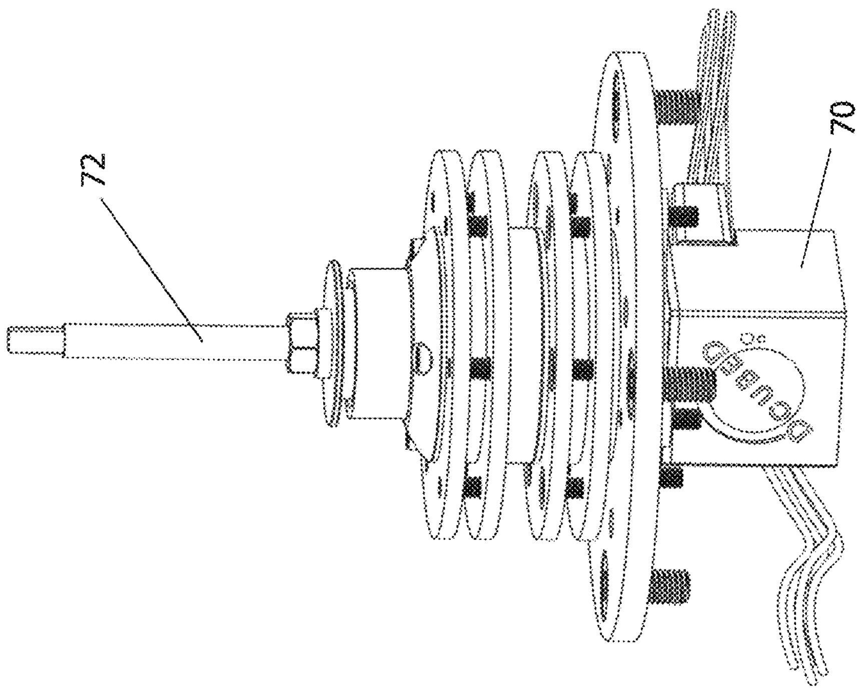
FIG. 9a-9b show a sectional view and a perspective view of a third tensioning device.
Figure 9A:
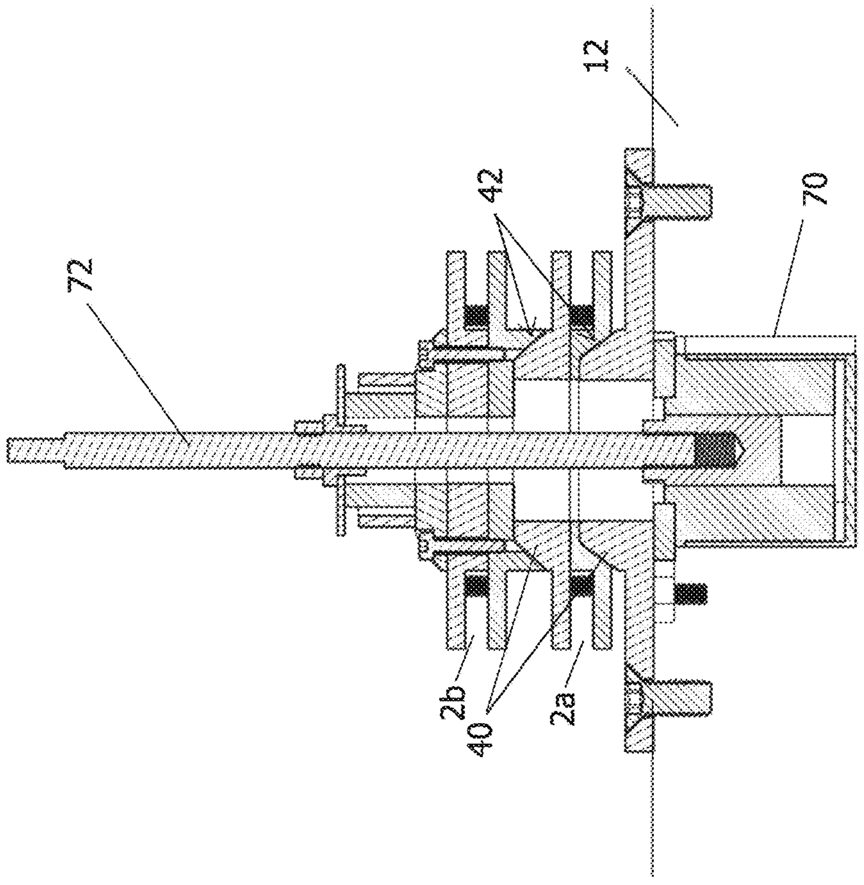

In the example shown in FIGS. 9*a*-9*b*, the tensioning device 4 is designed for use in the system 300. Instead of severing the connecting element 72, an actuator 70 is provided here that is configured to hold the connecting element 72 and only release it when required, in a switchable manner. Such actuators 70 are also known under the term "hold-down and release mechanism" (HDRM) or "release nut". The connecting element 72 can be rigid (e.g., a bolt), which enables greater tensile stresses. The actuator 70 can correspond in particular to the actuator module described in the German patent application DE 10 2020 000 688 A1, the connecting element 72 can be fastened to the nut 360 described there with reference to FIG. 9. The entire contents of DE 10 2020 000 688 A1 are incorporated herein by reference.

Figure 10B:
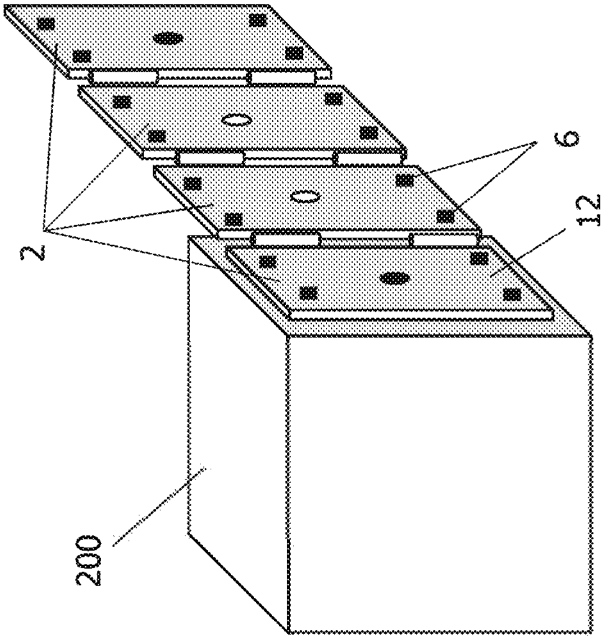
FIG. 10b shows the satellite with carrier panels in working pose.
Figure 10A:
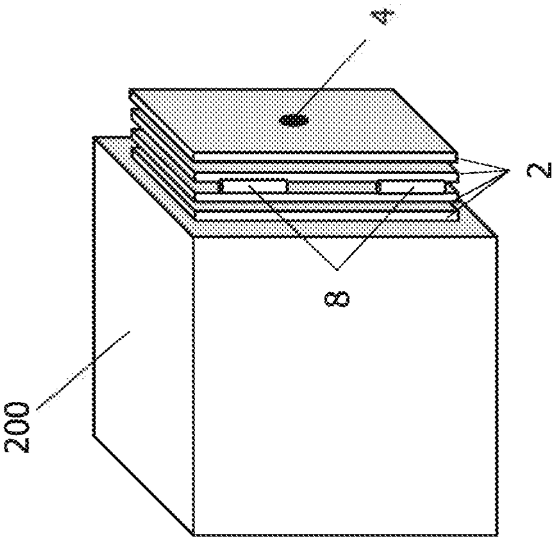
FIG. 10a shows a satellite with carrier panels in transportation pose.

FIG. 10*a* shows a satellite 200 with the system 100 and/or 300. In the example shown, the corresponding system comprises four carrier panels 2. In FIG. 10*a*, the tensioning device 4 is in the holding state, the carrier panels 2 are elastically deformed and lie on top of each other in a stack. After transportation into space, the carrier panels are moved into the working poses shown in FIG. 10*b*. For this purpose, the tensioning device 6 is switched to its release state, whereby the carrier panels 2 return to their resting form by reversing the elastic deformation. This return to the resting form pushes the carrier panels 2 away from the satellite 200 and also from each other, thus contributing to the unfolding of the row of carrier panels 2.

It is understood that the examples and embodiments described herein can be modified and/or combined with each other. For example, it is conceivable to use a support device 6 according to the example in FIGS. 6*a*-6*b* even in the case of only one carrier panel. Individual features described with reference to the figures can also be omitted. For example, a support device 4 can be used in which the support element 36 does not have a spherical surface 38 but a cylindrical surface. Further modifications and technical advantages of the solution described herein will be apparent to the person skilled in the art from the present disclosure.

The invention claimed is:

1. A system for a satellite, the system comprising a carrier panel and a tensioning device, the tensioning device being switchable from a holding state, in which it holds the carrier panel in a transportation pose, to a release state, in which it permits movement of the carrier panel from the transportation pose into a working pose, wherein the system is configured such that the carrier panel is elastically deformed in the transportation pose and, after switching the tensioning device into the release state, a restoring force based on the elastic deformation of the carrier panel contributes to the movement of the carrier panel from the transportation pose into the working pose, wherein the tensioning device is configured to, in the holding state, exercise a holding force on a first region of the carrier panel, and wherein the system further comprises a support device that is configured to guide a support force opposite to the holding force onto a second region of the carrier panel in the transportation pose of the carrier panel, wherein the holding force and the support force contribute to the elastic deformation of the carrier panel and/or cause the elastic deformation of the carrier panel.

2. The system according to claim 1, configured such that the elastic deformation is adjustable.

3. The system according to claim 1, wherein the elastic deformation comprises a bending of at least a portion of the carrier panel.

4. The system according to claim 1, wherein the second region is spaced from the first region in the direction of an outer edge of the carrier panel.

5. The system according to claim 1, wherein the tensioning device is configured to, in the holding state, pull the first region of the carrier panel in the direction of the satellite.

6. The system according to claim 1, wherein at least one of the tensioning device and the support device is configured such that a magnitude of the holding force and/or the support force is adjustable.

7. The system according to claim 6, wherein the support device is configured to adjustably define a distance of the second region from the satellite in the transportation pose of the carrier panel.

8. The system according to claim 1, wherein the support device comprises a support element with a spherical surface, wherein the spherical surface forms a support in the transportation pose of the carrier panel.

9. The system according to claim 1, wherein the tensioning device is configured to, in the holding state, center the carrier panel in a predetermined position at least in its length and width direction.

10. The system according to claim 9, wherein the tensioning device comprises a centering element for centering the carrier panel, the centering element having a frustoconical surface, wherein the frustoconical surface, in the holding state, forms a support.

11. The system according to claim 1, further comprising a hinge fixed to the carrier panel and defining an axis of rotation, wherein the movement of the carrier panel from the transportation pose to the working pose comprises a rotation about the axis of rotation, wherein the system is configured such that the elastic deformation of the carrier panel in a first part of the carrier panel is less than in a second part of the carrier panel, wherein the first part is closer to the hinge than the second part.

12. The system according to claim 1, wherein the tensioning device comprises an actuator that is configured to switchably bring the tensioning device from the holding state into the release state.

13. The system of claim 12, wherein the actuator is configured to be attached to the satellite and/or is configured such that, in the release state, it is decoupled from the carrier panel.

14. The system according to claim 1, wherein at least one solar cell is arranged on the carrier panel.

15. The system according to claim 1, further comprising at least one further carrier panel, wherein the tensioning device in the holding state holds the at least one further carrier panel in its transportation pose and in the release state permits a movement of the at least one further carrier panel from its transportation pose into its working pose.

16. The system of claim 15, configured such that the carrier panels lie on top of one another in a stack-like manner in their transportation poses.

17. The system according to claim 15, configured such that the at least one further carrier panel is elastically deformed in its transportation pose and, after the tensioning device has been switched into the release state, a restoring force based on the elastic deformation of the at least one further carrier panel contributes to the movement of the at least one further carrier panel from its transportation pose into its working pose.

18. An elastically deformable carrier panel that is configured to be used in a system for a satellite, wherein said system comprises a tensioning device that is switchable from a holding state, in which it holds the carrier panel in a transportation pose, to a release state, in which it permits movement of the carrier panel from the transportation pose into a working pose, wherein the carrier panel is configured to be elastically deformed in the transportation pose and that system is configured such that after switching the tensioning device into the release state, a restoring force based on the elastic deformation of the carrier panel contributes to the movement of the carrier panel from the transportation pose into the working pose, wherein the tensioning device is configured to, in the holding state, exercise a holding force on a first region of the carrier panel, and wherein the system further comprises a support device that is configured to guide a support force opposite to the holding force onto a second region of the carrier panel in the transportation pose of the carrier panel, wherein the holding force and the support force contribute to the elastic deformation of the carrier panel and/or cause the elastic deformation of the carrier panel.

19. A satellite comprising a system including a carrier panel and a tensioning device, the tensioning device being switchable from a holding state, in which it holds the carrier panel in a transportation pose, to a release state, in which it permits movement of the carrier panel from the transportation pose into a working pose, wherein the system is configured such that the carrier panel is elastically deformed in the transportation pose and, after switching the tensioning device into the release state, a restoring force based on the elastic deformation of the carrier panel contributes to the movement of the carrier panel from the transportation pose into the working pose, wherein the tensioning device is configured to, in the holding state, exercise a holding force on a first region of the carrier panel, and wherein the system further comprises a support device that is configured to guide a support force opposite to the holding force onto a second region of the carrier panel in the transportation pose of the carrier panel, wherein the holding force and the support force contribute to the elastic deformation of the carrier panel and/or cause the elastic deformation of the carrier panel.

* * * * *